No. 1,988. REISSUED JUNE 6, 1865.
W. E. HAGAN.
FURNACE FOR TREATING ORES BY SUPERHEATED STEAM.
Fig. 1.
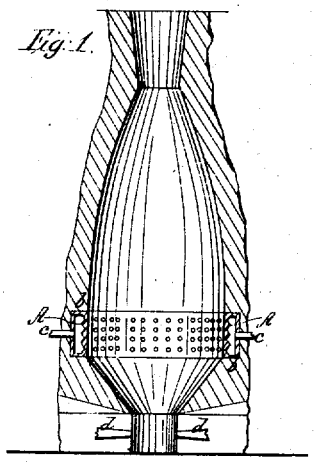
Fig. 2
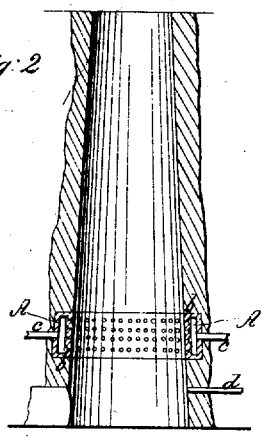
Fig. 3 Section 1-2.
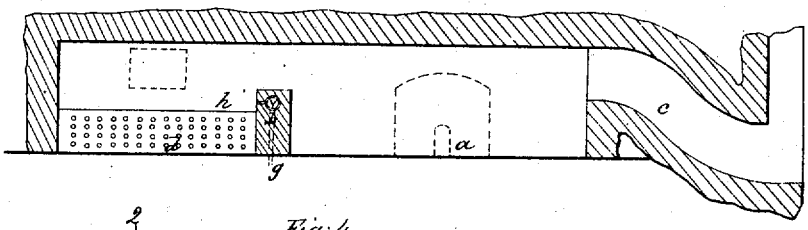
Fig. 4.
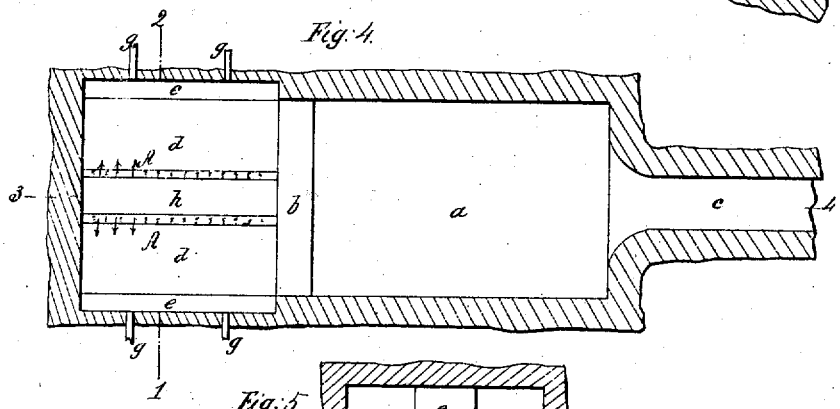
Fig. 5.
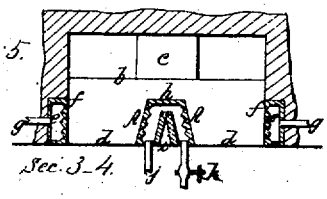
Sec. 3-4.
Witnesses;
T. A. Locke.
Oliver Daniel
Inventor;
W. E. Hagan

UNITED STATES PATENT OFFICE.

WILLIAM E. HAGAN, OF TROY, ASSIGNOR, BY MESNE ASSIGNMENTS, TO THE HAGAN MANUFACTURING COMPANY, OF NEW YORK, N. Y., AND SAID WILLIAM E. HAGAN.

IMPROVEMENT IN FURNACES FOR TREATING ORES BY SUPERHEATED STEAM.

Specification forming part of Letters Patent No. 41,897, dated March 8, 1864; Reissue No. 1,988, dated June 6, 1865.

DIVISION B.

*To all whom it may concern:*

Be it known that I, WILLIAM E. HAGAN, of the city of Troy, county of Rensselaer, and State of New York, have invented a new and improved method of calcining, desulphurizing, purifying, and treating ores and refining metals; and I do hereby declare that the following is a full, true, and exact description of the same, reference being had to the accompanying drawings, making part of this specification, in which—

Figure 1 is an ordinary blast-furnace for the reduction of metallic ores. Fig. 2 is an ordinary cupola-furnace for smelting and refining iron. Fig. 3 is a vertical section of an ordinary reverberating-furnace for treating ores and refining ores and other metals on the line 1 2, Fig. 4. Fig. 4 is a horizontal section of a reverberating-furnace on a plan above the grate-bars and the bed. Fig. 5 is a vertical section of same, drawn on the line 3 4, Fig. 4.

The same letters indicate the same parts in all the drawings.

The nature of my invention consists in the method of applying superheated steam to furnaces by which certain new and valuable chemical results are obtained from the decomposition of the steam in the manner and by the means substantially as herein described and set forth.

The distinguishing feature and novelty in my invention herein described is the direct discharge of superheated steam into the body of the fire, so that in its highly rarefied condition the aqueous vapor shall impinge upon and be brought in actual contact with the incandescent fuel without admixture of atmospheric air, while at the same time combustion is supported in part by draft through a grate or by hot or cold blast through tuyeres in the ordinary way—that is to say, the superheated steam is discharged from hollow retorts or chambers in jets directly into and among the incandescent coals, and not above or below the fire, where the air can reach the rarefied vapor of water before it strikes the incandescent coals or fuel. When super-heated steam without admixture of atmospheric air is thus caused to impinge directly upon ignited carbon, it undergoes decomposition into hydrogen and oxygen. ($H_2O^2$.)

Letters Patent of the United States were granted to me on the 8th day of March, 1864, for this method of employing superheated steam in stoves and furnaces, and the chemical principle and effects distinguishing my invention as well as the mechanical arrangements for applying it were fully described and explained in my original drawings and specifications. The application of my invention to metallurgical purposes were therein distinctly stated, and the drawings of blast, cupola, and reverberating furnaces described and referred to for their exemplification.

The mere form of a furnace constitutes no part of my invention described in this specification, and the different metallurgical operations were intended to be conducted in any and all of these furnaces or any equivalents therefor. The method of using and applying superheated steam, as described in this specification and in the drawings accompanying the same, constitute my invention, and no explanation of special applications can illustrate its fundamental character more clearly and fully than has been already done in my original specifications, but in order to remedy what might be deemed an omission or error, I will herein describe more particularly and fully the application of my invention to certain metallurgical operations designed by my original specification aforesaid.

Referring to my original specification of the patent granted to me March 8, 1864, it will be seen that after describing the mechanical arrangements adapted to the use of my invention in different kinds of furnaces for different metallurgical operations, and then considering further explanation unnecessary, I state "that from the foregoing any one skilled in the construction of stoves or furnaces for generating heat for various purposes in the arts will be enabled to apply my said invention to the various purposes which may be desired, as my invention relates entirely to the method of managing the combustion of fuel."

In the original drawings, Figs. 8, 9, 10, and in the accompanying drawings 3, 4, 5, represent an ordinary reverberating-furnace. Fig. 11 in the old drawings and Fig. 1 in the accompanying drawings represent an ordinary blast furnace. Fig. 12 in the old drawings and Fig. 2 in the accompanying drawings represent a cupola-furnace having my said invention thereto applied, as and for the purposes herein stated. These different kinds of furnaces are applicable tothe various metallurgical operations usually conducted in them, in conjunction with my said method of managing combustion by the introduction of superheated steam without admixture of air into the body of the fuel, substantially as herein stated.

In Figs. 4 and 5 of the accompanying drawings the letters *e e* represent retorts on both sides of the fire-chamber of a reverberatory-furnace, rising above the top of the grate-bars, and in Figs. 3, 4, 5 the letter *h* represents a retort in the middle of the fire-chamber. Superheated steam is conveyed from any suitable generating apparatus to these side retorts, *e e*, or equivalents therefor, by the pipes, *g g*, and to the middle retort, L, by the pipe *j*, the pipe with the cock K on the retort *h* being intended for the escape of steam from the retort during any stage of the process when desired so to do. The superheated steam is discharged into the fire through the perforations on the sides of the said retorts or chambers A A. The bridge-wall is designated by the letter *b*, the bed of the furnace by *a*, and the exit-flue by *c*.

The metal to be treated by my said invention is placed on the bed and worked in the ordinary way. I am enabled by my said method of managing combustion to introduce a full or powerful current of hydrogen, which is thrown upon the raw metal in a state of fusion. The hydrogen has a great affinity for the carbon in the iron, and also for sulphur, phosphorus, arsenic, and other impurities. The iron is thus rapidly refined and brought to nature or to the chemical relations of wrought iron and steel in the proportions of carbon and pure iron in the mass undergoing treatment by my said invention and improvements.

In this same furnace the operation of removing sulphur, phosphorus, and other volatile substances from rocks and minerals containing precious metals may be advantageously conducted, the hydrogen of the decomposed steam being thrown in, onto, and among the ores lying upon the bed of the reverberating-furnace, and by its affinity for these substances carrying them off in a gaseous form. By the combined action of the heat and the hydrogen-gas the rocks and minerals are thoroughly calcined or disintegrated and purified, so that they can be crushed with facility for the extraction of gold and silver by amalgamation with great ease and rapidity. Other forms of furnace may be used however for the same purpose of my said invention, the ores being contained in a receptacle or chamber separate and distinct from the fire-chamber to which the products of combustion are to be conducted, if deemed best so to do.

Fig. 1 of the said drawings represents an ordinary blast-furnace in which superheated steam is introduced through the annular retorts or chambers A A, which have perforations on the inside for discharging the superheated steam into the fire, as shown at *b b*. The pipes for conveying the superheated steam into the retorts A A are shown by the letters *c c*. The quantity of the steam introduced may be regulated by valves placed upon the pipes or by any other means suitable for that purpose. The tuyeres *d d* supply the blast. By introducing superheated steam in this manner into a blast-furnace I am enabled to convert iron-ores into metallic iron without using the ordinary fluxes, the deoxidation and carbonization of the iron proceeding simultaneously under the chemical action which then takes place.

Fig. 2 of said drawings represents an ordinary cupola-furnace with the same arrangements for introducing superheated steam into it as in the blast-furnace, the same parts being indicated by the same letters in each. In this furnace the metal will be purified by the elimination of the sulphur, phosphorus, and other adulterations under the direct action of the hydrogen-gas produced by the decomposition of the superheated steam discharged upon, into, and among the incandescent coal or fuel according to my said method.

Having described my invention or discovery, what I claim, and desire to secure by Letters Patent, is—

1. The employment or application of superheated steam in the manner as or substantially as herein described and set forth, for the purpose of refining or reducing metals and for the removal of sulphur, arsenic, phosphorus, or other impurities from ores or minerals.

2. The employment or application of superheated steam as or substantially as herein described, for the purpose of calcining and disintegrating quartz-rock containing silver, gold, or other metals.

3. The employment or application of superheated steam for the refining of iron and for the converting of iron into semi or pure steel, in the manner substantially as herein described and set forth.

In testimony whereof I have hereunto set my hand this 8th day of March, 1865.

W. E. HAGAN.

Witnesses:

CHARLES D. KELLUM,
MARCUS P. NORTON.